United States Patent

Parkin

[11] 3,931,515
[45] Jan. 6, 1976

[54] RADIANT ENERGY DETECTION APPARATUS

[75] Inventor: William J. Parkin, Wayland, Mass.
[73] Assignee: Sanders Associates, Inc., Nashua, N.H.
[22] Filed: Sept. 24, 1964
[21] Appl. No.: 399,111

Related U.S. Application Data

[63] Continuation-in-part of Ser. No. 272,181, April 5, 1963.

[52] U.S. Cl.......... 250/216; 250/203 R; 250/211 K; 250/338; 244/3.16; 356/152
[51] Int. Cl.......................... H01j 39/12; G01j 1/20
[58] Field of Search............ 250/203 R, 211 K, 215, 250/338; 315/24; 343/5 DP, 7, 10, 11, 17.1; 356/152; 244/3.16

[56] References Cited
UNITED STATES PATENTS

| | | | |
|---|---|---|---|
| 2,952,779 | 9/1960 | Talley | 250/203 R |
| 3,143,650 | 8/1964 | Mizen | 250/83.3 |

OTHER PUBLICATIONS

Rhodes, "Introduction to Monopulse," McGraw–Hill, 1959, pp. 71–72.

*Primary Examiner*—Maynard R. Wilbur
*Assistant Examiner*—S. C. Buczinski
*Attorney, Agent, or Firm*—Louis Etlinger; Richard I. Seligman

[57] ABSTRACT

Optical detecting, tracking and indicating apparatus for producing a target angular position signal independent of target intensity. A photoconductive detector element has four outer electrodes disposed in a rhombic pattern and a centrally disposed inner electrode. A pair of quadrantly phased, alternating current primary bias signals are coupled to oppositely disposed electrode pairs. The central electrode is coupled through a load impedance and a source of secondary bias signal at a second frequency differing from the first bias signal frequency. A composite signal including both phase and frequency components of the primary bias signals appears in the output. The composite signal varies with target position and intensity. A secondary output signal at the second frequency varies only with intensity. A divider circuit divides the composite signal by the secondary signal to produce an output signal which varies only in accordance with the relative position of radiant energy impingent on the photoconductor.

6 Claims, 6 Drawing Figures

INVENTOR
WILLIAM J. PARKIN
BY David A. Rich
ATTORNEY

INVENTOR
WILLIAM J. PARKIN
BY David A. Rich
ATTORNEY

RADIANT ENERGY DETECTION APPARATUS

This application is a continuation-in-part of my co-pending TRACKING CIRCUIT application, Ser. No. 272,181, filed Apr. 5, 1963.

The present invention relates generally to radiant energy sensing apparatus and devices. More particularly the invention relates to optical and near-optical sensing apparatus and devices. More especially the invention relates to infrared tracking apparatus and devices for detecting and tracking infrared signals.

This application presents an improvement relating to copending applications entitled RADIANT ENERGY DETECTOR, Ser. No. 253,503, filed Jan. 23, 1963; TRACKING SYSTEM, Ser. No. 253,504, filed Jan. 23, 1963, now abandoned; and TRACKING CIRCUIT, Ser. No. 272,181, filed Apr. 5, 1963.

The application further relates to co-pending application filed of even date herewith entitled DIVIDER CIRCUIT, Ser. No. 398,897, now U.S. Pat. No. 3,292,013, invented by Yehuda Golahny and having a common assignee.

Detector elements which change electrical characteristics in response to radiation are broadly useful in the invention. Passive detector elements which change in an impedance characteristic as well as active elements which produce a voltage, current, or, indeed, emission of charged particles have application herein. Of particular use in the preferred embodiment are detector elements having a variable impedance or resistivity, or conversely, conductivity, in response to radiation. The change in impedance may be due to the well-known photoelectric effect or to energy absorption in the atomic or quantum mechanical sense.

Photoelectric devices for sensing the presence of infrared energy are broadly classified photovoltaic and photoconductive. The photovoltaic infrared detectors produce a voltage in response to the presence of infrared. The photoconductive detectors provide a variable conductivity in response to the presence of infrared energy.

Radiation absorption materials of the type used for bolometers for radiation intensity measurements epitomize an absorption-type detector. Resistive materials of this character are marketed under the name "Thermistor" by Barnes Engineering Company, Stamford, Connecticut.

The expression "radiation responsive, variable impedance", as used herein, includes, but is not limited to, impedance changes due to electromagnetic radiation in its various forms impingent, e.g., upon a detector element. The terms thermoelectric, thermovoltaic, thermoconductive and thermosensitive, as used herein, are analogous to photoelectric, photovoltaic, photoconductive, and photosensitive in that a variation in an electrical characteristic takes place in response to radiation of a thermal or optical character. Thermoconductive materials vary in impedance due to absorption of energy whatever the radiation frequency. Such materials, in the first order, vary in impedance with temperature. Since the temperature varies with radiation absorption, the impedance varies in response to radiation. While the invention is typically utilized in conjunction with optical and near-optical frequencies, it will be apparent that many types of radiation are well within the scope of the inventions. Other examples include electromagnetic particle radiation such as atomic and sub-atomic particles.

Typical prior art circuits use a photoconductive infrared detector placed in series with a direct current bias source and a load impedance. The impingement of infrared energy upon the infrared detector cell has the effect of increasing its conductivity to produce a higher voltage across a load impedance. In effect, the cell and the load impedance provide a potentiometer to produce an output direct current signal which is a function of the amount of infrared energy impingent on the cell.

To provide an indication of the location of a target, prior art systems typically utilize a rotating vane or reticle which partially obscures the cell and rotates about the central axis of the cell. The system produces a null error signal when the target is precisely on boresight, that is, along the central axis of the optical cell and its associated optical system. The output voltage across the load impedance is a constant. While the target is located off the axis, the exposure of the cell to infrared energy varies with the position of the vane. In effect, the rotating vane provides a modulation which appears as an alternating current component across the load impedance. The amplitude of the modulating signal is a function of the degree of offset of the target from the boresight axis.

This prior art system is primarily a null seeking system. When the target image is displaced from the boresight axis, an error signal is produced. The error signal is an alternating signal superimposed on the direct current signal. The phase of the error signal indicates, when compared with a reference signal, the error in direction, and the amplitude, the degree of displacement or offset from the boresight axis.

Such prior art systems are subject to the disadvantages of rotating mechanical devices. These disadvantages include lack of reliability and a limitation on the possible information rate. The mechanical limitations on infrared information rate, for example, are quite important in the presence of an intermittent source of radiation. Furthermore, variations in target intensity produce an ambiguity in the output signal as a true indication of the target direction. The position of the target image is indicated in the plane of the cell as the distance or radius R from a reference origin and angle $\theta$ of the radius relative to a pair of orthogonal reference axes, e.g., azimuth and elevation or horizontal and vertical. IP IX XY is the plane of the cell and Z is the boresight axis, the direction of an object O located at $X_o$, $Y_o$, and $Z_o$ in space is a function of the angle A of the object O relative to the boresight or Z axis and the plane of the cell. The object direction, however, is also a function of the angle $\theta$ of the radius R in the XY plane. The radius R is representative of the boresight displacement angle A and is represented by the amplitude of an output signal. While the amplitude of an output signal is a function of the radius R, it is also a function of the intensity I of the target image. Thus, variations in intensity produce an uncertainty as to the true direction of the object O.

In my co-pending TRACKING CIRCUIT application noted above, sensing apparatus and devices and tracking systems are disclosed which produce an output signal in accordance with the position of a radiation source. The above noted TRACKING CIRCUIT application relates to an improvement directed to the production of an output signal in accordance with a plurality of radiation characteristics, such as, for example, intensity level and amplitude modulation signals as well as, position. Thus the circuit embodying the tracking circuit invention tracks a source of radiation while simultaneously demodulating amplitude variations through a common aperture.

The co-pending TRACKING CIRCUIT application is subject to the same ambiguity problem in providing spot position indications. More particularly since impingent energy on the cell may vary in intensity and the output signal from the cell is a function of intensity as well as position, an ambiguity in the output information exists. This ambiguity for prior art systems can be overcome by removing one of the variables of the system, for example, the intensity. There are a number of parameters associated with the target image. Its position, for example, is determined by X and Y coordinates or so-called azimuths and elevation coordinates. Other parameters related to the radiant energy are the size of the image, the frequency, the range, and the velocity. In the preferred embodiments of particular concern are the position coordinates and the intensity. The co-pending TRACKING CIRCUIT application presents a composite signal having $\overline{X}$, $\overline{Y}$ and I information, i.e., azimuth, elevation and intensity information, respectively. Variations in intensity of the target affect the apparent indications of positions. It is highly desirable therefore, to eliminate the intensity as an active factor in the system to provide pure position indication. In this manner a true spot position indicator is derived.

It is, therefore, an object of the invention to provide an improved radiant energy detection apparatus for producing an output signal in which variation occur independently of variations in a selected parameter of the radiant energy.

Another object of the invention is to provide an improved radiant energy detection apparatus for producing a true indication of the direction of a remote source of radiation or target without mechanically moving parts while simultaneously producing indications of target intensity variations.

A further object of the invention is to provide an improved radiant energy detection apparatus of the character described which is reliable in operation.

Yet another object of the invention is to provide an improved radiant energy detection apparatus of the character described which is capable of a relatively high information rate.

Still another object of the invention is to provide an improved radiant energy detection apparatus of the character described having substantially increased flexibility.

A still further object of the invention is to provide an improved radiant energy detection apparatus of the character described responsive to radiation through a common aperture.

In accordance with the invention there is provided a radiant energy detection apparatus. The apparatus includes a radiation responsive detector means for producing a composite signal representative of a plurality of parameters of the radiant energy. Means are coupled to the detector means for producing a reference signal representative of a selectd one of the plurality of parameters. Computer means are responsive to the composite and reference signals for producing an output signal representative of the quotient between the composite and reference signals. In this manner, variations of the output signal occur independently of variations of the selected one of the plurality of parameters.

The term "parameters of said radiant energy" as used herein includes, but is not limited to, parameters of the radiant energy relative to the radiation responsive detector means such as the location of the energy at the detector means.

In one form of the invention the detection apparatus includes a radiation responsive, variable impedance means, having a detector element with four input ohmic bias terminals arranged in a peripheral equidistant pattern and an output ohmic terminal centrally disposed with respect to the pattern. The element is adapted to vary in impedance in response to the radiation for producing a composite signal representative of a plurality of parameters of the radiant energy in accordance with the variation of a detector element 20 impedance with respect to another detector impedance. An example of the parameters include $\overline{X}$ or azimuth information, $\overline{Y}$ or elevation and I or intensity.

Primary biasing means are coupled to the element through the input terminal for coupling a pair of alternating current bias signals through the element. The bias signals are in phase quadrature and each bias signal is coupled through a pair of diagonally opposed input terminals. Load impedance means are coupled to the element through the output terminal for developing a reference signal representative of a selected one of the plurality of parameters in accordance with the variation of the detector element impedance with respect to the load impedance. Secondary biasing means are coupled to the element through all the terminals, the primary biasing and the load impedance means for coupling a secondary bias signal therethrough. Computer means are coupled to the detector and load means through the output terminal for producing, in response to the composite and reference signals, an output signal representative of the quotient between the composite and the reference signals. In this manner variations in the output signal occur independently of variations in the selected one of the plurality of parameters. Balancing means are coupled to the biasing means between the element and the biasing means for each bias signal and include a variable voltage control for producing a variable reference voltage level to balance the bias and output signals with respect to a reference level.

Other and further objects of the invention will be apparent from the following description of the invention, taken in connection with the accompanying drawings, and its scope will be pointed out in the appended claims.

PRINCIPLES OF OPERATION

In the conventional detection circuit, a photoconductive detector element, for example, a lead sulphide cell, forms part of a voltage divider. Modulated light impinging on the cell produces an electrical output. The voltage gradient across such a cell is linear and the equipotential lines, i.e., lines of equal voltages, are perpendicular to the direction of the current flow.

The sensing apparatus of the present invention as distinguished from the prior art provides in effect a rotating field detector. This result is obtained by introducing a pair of alternating current bias signals which are differing in phase, preferably in phase quadrature. By employing a cell having four ohmic terminals connected to the cell in a rhombic pattern, opposing pairs of terminals provide orthogonal axes. With an ohmic terminal disposed at the center of the rhombic pattern, an alternating signal applied to a pair of diagonally opposed co-linear terminals produces zero output unless an impedance unbalance occurs between the central terminal and one of the opposed bias terminals. This result in effect produces an output error signal the amplitude of which provides necessary information to determine the degree of offset or displacement of a source of radiation from the boresight or central axis of the cell. This, of course, is true for one of a pair of orthogonal axes. By introducing another alternating current across an axis physically orthogonal to the first axis as defined by the terminals, the information may be obtained for the other of a pair of orthogonal reference axes.

The effect of introducing a pair of quadrature phased bias alternating current signals to such a cell is to produce a rotating field. Because of the rotating field, a target image off the reference axes produces an error signal which varies in phase as well as amplitude. This phase variation enables the resolution from the resultant output error signal of orthogonal signal components, e.g., vertical and horizontal or azimuth and elevation.

The phase bias signals are preferably phased in quadrature for resolution with respect to orthogonal reference axes. The phase bias signals may differ in phase any degree for use with corresponding reference axes. Orthogonally phased output error signals may be produced by introducing appropriate phase correction in the circuitry following the cell. Under dark current or uniform background illumination conditions the cell produces no signal output. When radiation is received along the boresight axes, no unbalance, and, hence, no output signal is produced. The apparatus thus fails to produce an output signal in response, for example, to radiation intensity or to amplitude modulated radiation.

The functional requirement on the system to produce an output signal in response to amplitude variations of radiation on boresight appears to be inconsistent with the requirement to produce no error signal output in response to radiation received on boresight. In terms of the cell, it would appear that it must be balanced to respond to radiation on boresight and unbalanced to respond to variations in amplitude of radiation received on boresight.

This apparent paradox is overcome by introducing a secondary bias signal and external load impedance. The secondary bias signal is distinguishable from the phase bias signals, for example, by using direct current or a different frequency. For position error signal output, e.g., the system responds to a change in detector impedance with respect to itself. For variations in intensity of radiation received on boresight, e.g., the system responds to a change in detector impedance with respect to an external load impedance.

As noted above, the position error signals are also a function of intensity. For a system in which the primary bias signal may be designated $f_1$ and the secondary bias signal a differing frequency $f_2$, the signal $f_1$ includes $\overline{X}$, $\overline{Y}$ and I information, i.e., azimuth, elevation and intensity. The signal derived from such a detector includes both $f_1$ and $f_2$ signals. The $f_1$ signal is itself a composite signal including $\overline{X}$, $\overline{Y}$ and I information. On the other hand the $f_2$ signal is derived by virtue of the variation in impedance of the entire detector element against an external load impedance. Thus, essentially, the $f_2$ signal is a function purely of intensity and excludes the position information. By effectively dividing the composite $f_1$ signal by the $f_2$ signal, an output signal is produced which is representative only of position information. In this manner one obtains a true spot position indicator. The output signal which is representative only of a position varies independently of the intensity as opposed to the composite $f_1$ signal which is ambiguous in its indication of position information because of the variation in intensity.

The output signal thus derived is substantially constant for all possible positions on the cell of a given target image above a selected signal threshold. In contrast, the amplitude of the composite signal along, for example, a 45° axis on the cell, differs from that for a target image on the vertical or horizontal axis. In a tracking system this characteristic becomes exceedingly important.

Figure 1:
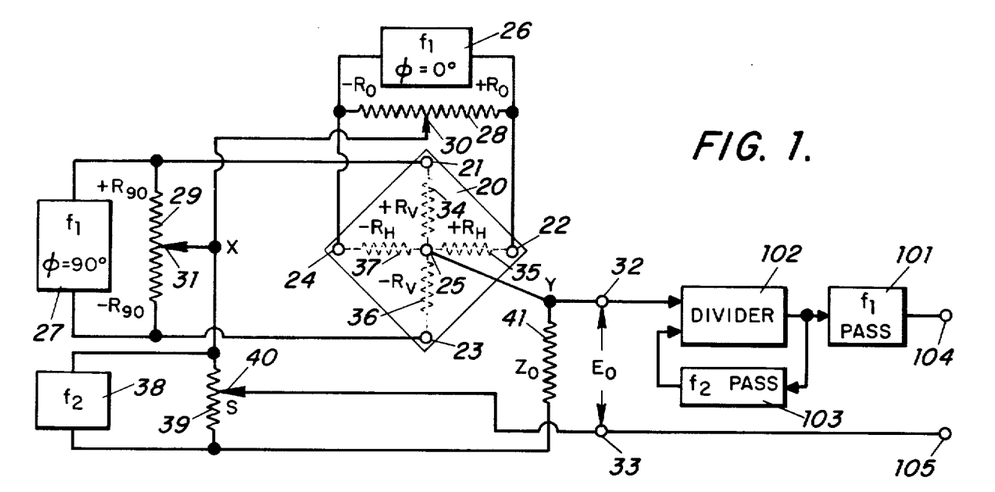
FIG. 1 is a schematic circuit diagram of a radiant energy detection apparatus embodying the invention.
Figure 2:
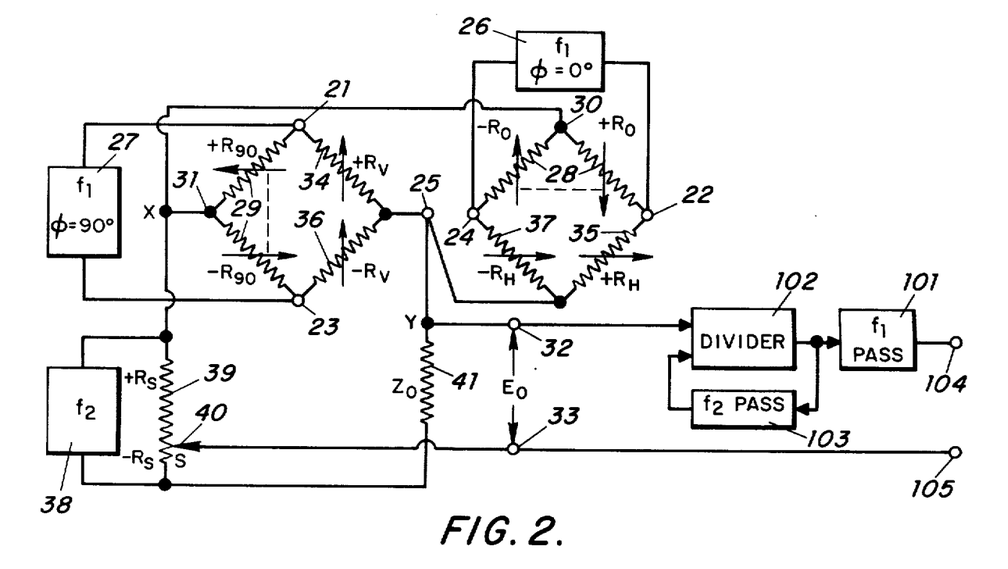
FIG. 2 is an equivalent circuit of the apparatus in FIG. 1.
Figure 3:
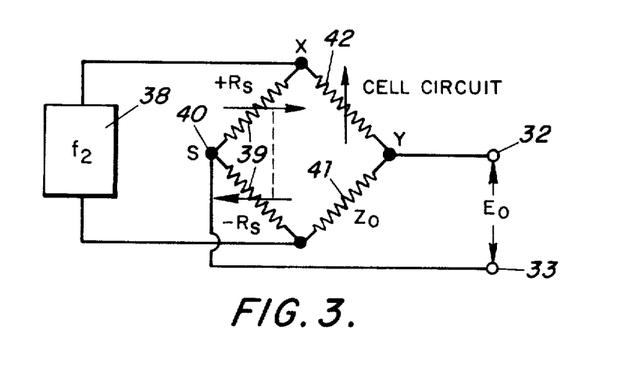
FIG. 3 is an equivalent circuit of a portion of the circuit in FIG. 2 with particular emphasis on the secondary bias.

DESCRIPTION AND EXPLANATION OF THE DETECTION APPARATUS IN FIGS. 1, 2 AND 3.

Referring now to the drawings and with particular reference to FIG. 1, there is here illustrated a schematic circuit diagram of a sensing apparatus embodying the principles of the invention. Here a radiation responsive, variable impedance detector element, such as a photoconductive or thermoconductive element, provides the basic sensing element for the circuit. The element is shown coupled to a pair of alternating current primary bias signal generators of differing phase, here phase quadrature. Primary balancing means potentiometers are coupled in parallel with the bias generators. A secondary bias signal generator and an external load impedance are coupled between the primary bias signal generators and the detector element.

Thus a photoconductive detector element 20 having four input ohmic bias terminals 21–24, inclusive, peripherally disposed in a square, or more generally a rhombic pattern and a centrally disposed, output ohmic terminal 25 provides the basic sensing element. Primary biasing means, for example, a horizontal bias signal generator and vertical bias signal generator, are each coupled to a pair of diagonally opposed input bias terminals. The horizontal and vertical generators correspond with generators 26 and 27 here designated as $f_1$, $\theta=0°$ and $f_1$, $\theta=90°$, respectively. The legend $f_1$ indicates a predetermined frequency and the legend $\theta$ indicates the relative phase of the bias signals. The generator 26 couples a reference or 0° phase bias signal to the diagonally opposed input bias terminals 22 and 24 of the element 20. The generator 27 couples a quadrature or 90° phase bias signal to the other two input bias terminals 21 and 23. The bias signals are thus in phase quadrature. A secondary biasing means, here a generator 38 designated $f_2$, is coupled to the element 20 through a load impedance means or resistor 41 to the element 20 through its output terminal 25.

A primary balancing means, here shown including potentiometer stators 28 and 29, are coupled respectively between the biasing means generators 26 and 27 and the element 20. The potentiometers or variable resistors have variable electrical connections 30 and 31 coupled respectively to the stators 28 and 29. The variable connections are joined at a junction indicated as X. The primary balancing means, including the potentiometer stators 28 and 29 and the variable connections 30 and 31, are thus coupled to the bias means including the generators 26 and 27, between the element 20 and the primary biasing means including the generators 26 and 27 for each of the bias signals. The balancing means, hence, include a variable voltage control for each of the bias signals to produce a variable reference bias signal and an independently variable quadrature bias signal relative to a first reference voltage level to balance the phase bias and output signals with respect to the reference level.

A secondary balancing means includes a potentiometer stator 39 coupled in parallel with the secondary bias signal generator 38. The generator 38 and the stator 39 are connected to the junction X and, through the resistor 41, to a junction designated as Y connected to the detector terminal 25. The secondary potentiometer has a variable electrical connection 40 coupled to the stator 39 and connected to an output terminal 33. An output signal $E_0$ is developed between an output terminal 32 connected to the junction Y and the terminal 33.

The internal equivalent resistance of the detector element or photocell is indicated in dashed lines by the phantom lumped constant resistors 34–37 connected between the element output terminal 25 and the input bias terminals 21–24, respectively. The resistors 34–37 are also indicated as $\pm R_V$ and $\pm R_H$ as shown. The phantom resistors are helpful in describing a physical pair of orthogonal reference axes with respect to which the position of a point of received energy may be indicated.

The output $E_0$ at the terminals 32 and 33 represents an output signal which includes both the composite $f_1$ and $f_2$ signals. The terminal 32 is coupled to a divider 102. The output of the divider is coupled to an $f_1$ bandpass filter 101 and in parallel to an $f_2$ bandpass filter 103. The output of the filter 102 is coupled back to the divider 102. The output of the filter 101 provides an output signal representative of position and containing both $\overline{X}$ and $\overline{Y}$ information to provide an indication of the azimuth and elevation of a target.

Referring now to FIG. 2, the equivalent circuit of the circuit in FIG. 1 is illustrated. In FIGS. 1-8, like elements have like reference numerals. The circuit in FIG. 2 illustrates particularly the independence of control of the phase bias signal circuits with respect to the junctions X and Y. The effect of the secondary bias signal is particularly illustrated in FIG. 3 as will be described below. Here a pair of bridge circuits representing the equivalent resistances of the phase bias and detector element circuits illustrates the independence of control or adjustment of each of the phase bias signal circuits at the junction Y relative to the reference voltage level at the junction X.

The potentiometer stators 28 and 29 are shown with the elements $\pm R_0$ and $\pm R_{90}$ variable in an inversely coupled manner to correspond with the variation in resistance attributable to motion of the variable electrical connections 30 and 31 respectively. The resistors marked $\pm R_V$ and $\pm R_H$ are equivalent lumped constant resistors which vary in accordancce with impingent radiant energy.

The secondary bias signal generator 38 marked $f_2$ is connected in parallel with the potentiometer 39. The generator 38 and potentiometer 39 are connected in series with the load impedance resistor 41 marked $Z_0$. The stator of the potentiometer has resistor sections marked $\pm R_S$ for reference in FIG. 3. The variable potentiometer electrical connection 40 provides a second reference voltage level indicated at S.

Referring now to FIG. 3, the equivalent circuit of the circuit in FIG. 2 is illustrated. Here a variable resistor 42 represents the entire bridge circuit between the points X and Y. The discussion which follows is with reference to FIGS. 2 and 3.

With no optical signal impingent on the photocell 20, that is, under dark current conditions, the output signal $E_0$ between the terminals 32 and 33 can be any predetermined amount. The signal represented by $E_0$ includes both horizontal and vertical information, or, more generally, orthogonally resolvable phase components of frequency $f_1$ as well as a data bearing signal of frequency $f_2$. For the case wherein $f_2 = 0$ or direct current, the signal $f_1$ becomes data bearing by virtue of variations in a selected characteristic other than phase, e.g., in amplitude.

The system must be balanced for purposes of providing a position reference for impingent radiant energy with respect to which a position error signal is produced. This requirement is apparently incompatible with producing a signal in accordance with, e.g., variations in amplitude of impingent energy. The discussion which follows describes how the system is balanced for purposes of position error signals and unbalanced for amplitude variation signals.

In the simplest case the variable potentiometer electrical connection 31 may be varied to balance the vertical bias signal and output signal $E_0$ relative to the reference voltage level at the point X to produce, for example, zero vertical voltage output therebetween. Similarly, the variable connection 30 may be adjusted to produce a zero horizontal voltage output between X and Y. In this manner the quadrature and output signals are balanced relative to the reference voltage level at the point X. Note that with respect to the point X the reference or horizontal bias signal can be adjusted independently from the quadrature or vertical bias signal.

Having balanced the bridge circuit between points X and Y, the secondary bias signal may be adjusted to produce a predetermined output signal $E_0$, e.g., of zero volts, between the terminals 32 and 33.

For the bridge circuit between X and Y, the dark current condition and uniform illumination at the cell 20 produces no unbalance, and, hence, no output position error component in the output signal $E_0$. If the dark current condition is used as a standard, uniform illumination of the cell unbalances the circuit of FIG. 3 to produce an output data bearing signal component in the output signal $E_0$. Note that with respect to the point Y, the secondary bias signal $f_2$ may be adjusted independently of the phase bias signals $f_1$.

The bridge circuit as illustrated responds to an unbalance signal of some kind in order to produce an output position error signal component. The bridge circuit balance condition described above is determined for the purpose of producing an output signal in response to an unbalance condition caused by an impingent optical signal off boresight. A spot of light falling on the boresight axis illuminates the surrounding area uniformly and symmetrically to produce no unbalance in the cell. A spot of light falling between the terminals 25 and 21 along the vertical axis has the effect of reducing the resistance $+R_V$ to produce unbalance in the cell since the resistance $-R_V$ is unaffected.

Assume an input voltage, for example, of 100 volts appearing between the terminals 21 and 23, then the voltage potentials across the resistors $+R_V$, $+R_{90}$ and $-R_V$, $-R_{90}$ for a balanced condition will be equal and opposite with respect to the points X and Y. Assume instantaneous voltage polarities of negative or minus terminal 21 and positive or plus terminal 23. For the balanced condition, the potential across each resistor is 50 volts. Starting with Point Y, the voltage across the resistor $+R_V$ is equal and opposite to the voltage across the resistor $+R_{90}$.

Now consider an unbalance between the phase bias voltages appearing across the resistors $\pm R_{90}$, for example, a voltage across $+R_{90}$ of 10 volts. Then the voltage across $-R_{90}$ is 90 volts. Starting from point Y the voltage across $+R_V$ is +50 volts added to the negative 10 volts across $+R_{90}$ to produce a voltage between X and Y of +40 volts. Going the other way from the point Y the voltage across $-R_V$ is $-50$ volts in series with the +90 volts across $-R_V$ to produce again +40 volts. Note that the reference voltage level in this condition may be taken to be 40 volts. If the resistance $\pm R_V$ were internally unbalanced correspondingly in the same proportion, 10 volts would appear across $+R_V$ and 90 volts across $-R_V$ to produce zero volts between X and Y for no signal condition.

For the condition in which the voltages across $\pm R_V$ are balanced, light impinging in the region between the terminal 25 and the terminal 21 along the vertical axis tends to decrease the resistance $+R_V$. Assuming that the voltage across the resistor $+R_V$ is +40 volts and across the resistor $-R_V$ is $-60$ volts, the voltage between X and Y becomes 10 volts. It may seem that the vertical signal component in the output signal $E_0$ is a function of the variation in impedance in response to radiant energy of $+R_V$ relative to $-R_V$.

The resultant 10 volt output signal for an unbalance of 10 volts across $\pm R_V$ with $\pm R_{90}$ balanced, may be determined by adding the voltages in a similar manner. The +40 volts across $+R_V$ and the $-50$ volts across $R_{90}$ yield $-10$ volts output; the $-60$ volts across $-R_V$ and the +50 volts across $R_{90}$ yield again $-10$ volts.

Noting that the phase bias signal $f_1$ is indeed a composite signal including both the vertical and horizontal complement, the above analysis is equally appropriate to the circuit associated with the reference or horizontal bias signal generator 26. Once the system is balanced as, for example, by a predetermined setting, the output signal between X and Y is a function of the unbalance impedance, e.g., due to the displacement of a light spot off origin. Note that in the region between, but not including, the terminals 25 and 21 a light spot of given intensity may move up and down the axis and vary the output signal in accordance with the sensitivity curve of a given cell configuration. The circuit responds also to a variation on intensity at a given point. For a given intensity the output position error signal amplitude responds in accordance with displacement from the origin.

To illustrate the operation of the secondary bias signal, in FIG. 3, assume $f_2$ input of 100 volts between X and the junction $-R_S$, $Z_0$, with point X negative or minus instantaneous voltage polarity. The output signal $E_0$ appears between the points Y and S and at the output terminals 32 and 33.

Because the voltage across X and Y produced by phase bias signal $f_1$ is distinguishable from the secondary bias signal $f_2$, the circuit of FIG. 3 need be analyzed only with respect to $f_2$. The operation of the circuit in FIG. 3 is independent of the bridge circuit between X and Y with respect to adjustments in the bias signals $f_1$ and $f_2$.

For dark current condition, no radiation impingent on the cell, the $f_1$ voltage from X to Y is zero for a balanced condition. The voltage from Y to S may then be adjusted, e.g., to zero. Variations in intensity of impingent radiation produce correspondence impedance variations in resistor 42. Such variations unbalance the circuit in FIG. 3 to produce an output data bearing signal component in the output signal $E_0$.

Thus, for an input of 100 volts across stator 39, the voltages across $\pm R_S$ are 50 volts and the voltages across X–Y and $Z_0$ are 50 volts, assuming $Z_0$ is equal to the resistance of resistor 42. The voltage potentials across X–Y and $+R_S$ are equal and opposite; similarly across $Z_0$ and $-R_S$. The output signal $E_0$ is then zero.

With energy impingent on the cell along the boresight axis, no output is produced across X–Y. However, resistor 42 decreases in resistance, i.e., the cell bridge circuit impedance varies with respect to $Z_0$. If the voltage across X–Y decreases to 45 volts, the voltage across $Z_0$ increases to 55 volts. Tracing from point Y to point S, $\pm 45$ volts across X–Y algebraically adds to $-50$ volts across $+R_S$ to produce $-5$ volts between Y and S. The $-55$ volts across $Z_0$ adds to the +50 volts across $-R_S$ to again produce -5 volts out. Thus an output signal component at $f_2$ is produced regardless of the relative position of a spot or point of radiation impingent on the cell.

If $Z_0$ differs in resistance from resistor 42, the potentiometer 39 may be adjusted by moving the variable connection 40 to balance the circuit and provide a secondary reference voltage level. If, under dark current condition, the voltaage across X–Y were 45 volts and the voltage across $Z_0$ were 55 volts, the connection 40 is varied to provide equal and opposite voltages across $\pm R_S$, respectively, to produce an output zero volts.

It will be apparent from the description of FIG. 3 that the invention has application to a single dimension circuit. By removing the connection from the $f_1$, $\theta=0°$ generator 26 to the input terminals 22 and 24, e.g., the circuit may be used for vertical errors signals only.

Figure 4:
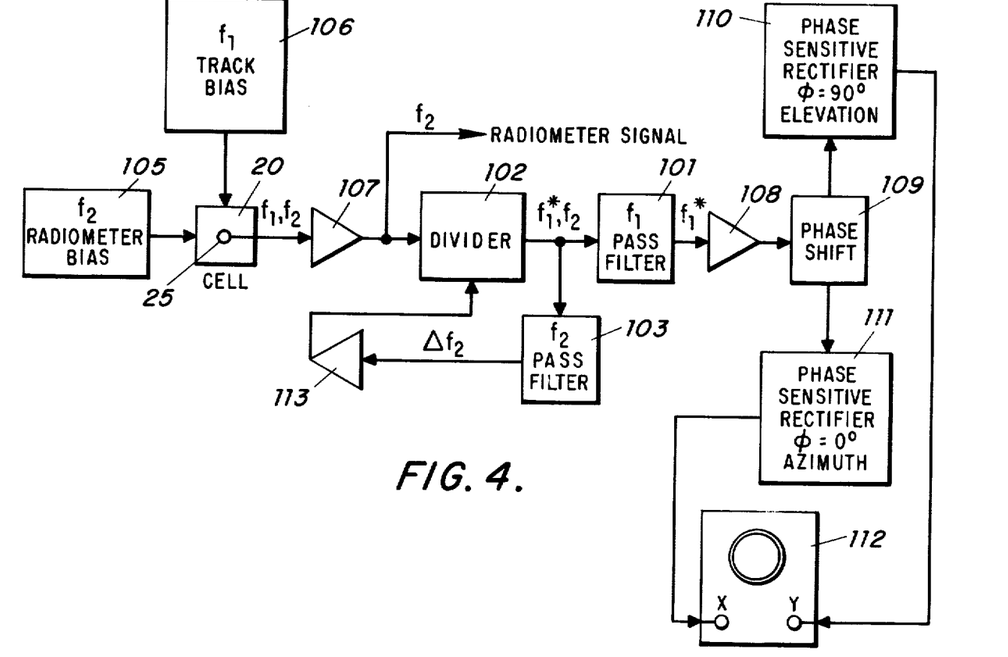
FIG. 4 is a schematic block diagram of a radiant energy position indicator apparatus embodying the invention.

DESCRIPTION AND EXPLANATION OF THE BLOCK DIAGRAM OF FIG. 4

Referring now to FIG. 4, there is here illustrated a schematic circuit block diagram of a spot position indicator embodying the invention. The cell 20 is shown coupled to an $f_1$ track bias circuit 106 corresponding to the circuits associated with the generators 26 and 27 of FIG. 1 and to an $f_2$ radiometer bias circuit 105 corresponding to the generator circuit 38 of FIG. 1. The output of the cell 20 is coupled from the central terminal 25 to an amplifier 107 and then to the divider 102. The divider output is coupled through the $f_1$ pass filter 101 and an amplifier 108 to a phase shift control 109. The phase shift control 109 is coupled to a phase sensitive rectifier 111 which produces azimuth information in accordance with the zero degree phase components of the divided $f_1$ signal. The output of the azimuth phase sensitive rectifier 111 is coupled to the x-axis or azimuth terminal of a display oscilloscope 112. The other output of the shift control 109 is coupled to elevation phase sensitive rectifier 110 which is in turn coupled to the Y-axis or elevation control of the scope 112.

The $f_2$ error signal, $\Delta f_2$, is coupled from the output of the divider 102 to the $f_2$ pass filter 103 and then to an amplifier 113 back to the divider 102. Another output of the amplifier 107 provides an $f_2$ radiometer signal which may be demodulated and applied to an output indicator. The output of the cell 20 at the terminal 25 as described above is a composite $f_1$ signal including $\overline{X}$, $\overline{Y}$ and I information as well as the separable $f_2$ signal which contains just the I information. The two signals are amplified and applied to the divider 102. At the output of the divider 102 is a divided $f_1$ signal which contains only the $\overline{X}$ and $\overline{Y}$ information, the I information having been divided out. Since the signals are separated in frequency, the $f_1$ being, for example, 400 cycles, and the $f_2$ signal being, for example, 1300 cycles, the filter 101 passes only the $f_1$ signal and rejects substantially all other signals. Similarly, the filter 103 passes only the $f_2$ signal and rejects all others. The $f_1$ output of the filter 101 is amplified by the amplifier 108 and applied to the phase shift correction circuit 109. The orthogonal $\overline{X}$ and $\overline{Y}$ components of the $f_1$ signal are resolved by the phase sensitive rectifiers 110 and 111 into elevation and azimuth or vertical and horizontal signals applied to the $\overline{X}$ and $\overline{Y}$ axes respectively of the oscilloscope 112. The apparent position of a target image on the face of the oscilloscope is unambiguous in angle and displacement from the origin.

The $\Delta f_2$ error signal is coupled through the amplifier 113 and applied to the divider 102 to provide a variable gain control signal in the manner to be described more particularly below.

Figure 5:
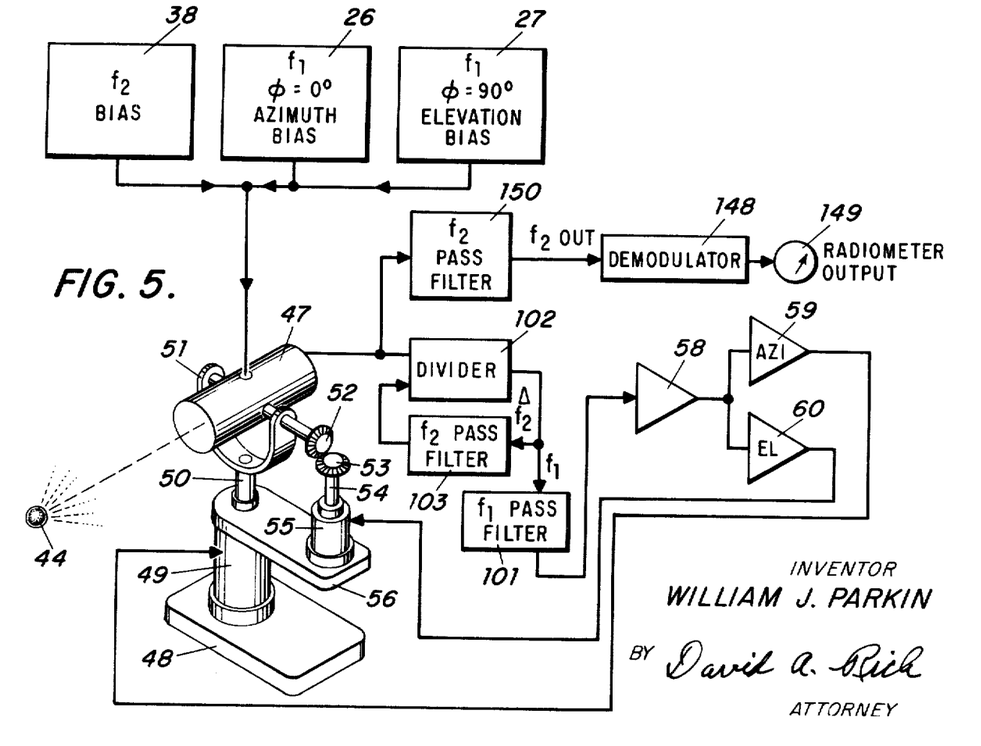
FIG. 5 is a schematic block diagram of a radiant energy detection and tracking apparatus embodying the invention.

DESCRIPTION AND EXPLANATION OF THE APPARATUS IN FIG. 5

Referring now to FIG. 5, there is here illustrated a radiant energy detection and tracking apparatus embodying the invention. A source 44 of radiation directs radiant energy to a detector element of the type shown in FIG. 1. The element is carried by a movable member 47 gimballed for motion in elevation and azimuth or vertical and horizontal, respectively. The intensity of radiation varies, for example, due to the motion of the source 44, variation in its aspects or variations in atmospheric conditions. A mounting plate 48 carries an azimuth servo motor 49. The motor 49 is coupled to a rotatable shaft 50 of a gimbal yoke 51 which carries the member 47. The member 47 is rotatable about an axis perpendicular to the axis of the shaft 50. The yoke 51 is coupled to an elevation servo motor 55 which moves in azimuth with the yoke. A pedestal plate 56 carries the motor 55 and is attached to the yoke 51. The rotatable shaft of an elevation pinion gear 52 extends through bearing supports in the yoke 51 and is attached to the member 47. The gear 52 is coupled to a planar elevation driving gear 53 coupled through a rotatable shaft 54 to the elevation servo drive motor 55.

The member 47 carries a focusing optical system to capture the radiation and focus a convergent beam to provide a point or spot image on the detector element. For clarity the focusing system, load impedance and detector element are omitted from FIG. 5.

The detector element derives input phase bias signals from the generators 26 and 27. The phase signals have a designated frequency $f_1$ and are in phase quadrature. The reference or azimuth phase is $\theta=0°$ and the quadrature or elevation phase is $\theta=90°$. The element derives a secondary bias signal from the generator 38. The secondary signal has a frequency designated $f_2$ distinct from $f_1$. In one form of the invention $f_2 = 0 = $ DC.

The $f_1$ drive signals are coupled through a divider 102 and $f_1$ pass filter 101 to a drive signal amplifier circuit 58. The circuit passes only $f_1$ signals and rejects substantially all other signals. The amplifier 58 is coupled to an azimuth amplifier circuit 59 and, in parallel, to a separate elevation amplifier circuit 60. The azimuth amplifier 59 is coupled to the azimuth servo drive motor 49; the elevation amplifier 60, to the elevation motor 55.

The composite $f_1$ signal contains $\overline{X}$, $\overline{Y}$ and I information. The $f_2$ signal is coupled through the divider 102 to an $f_2$ bandpass filter 103. The output of the filter 103 is coupled back to the divider 102. The divided $f_1$ signal contains position information, $\overline{X}$ and $\overline{Y}$ which is coupled to the drive system. The $f_2$ signal component from the member 47 is coupled through a second $f_2$ pass filter 150 to a demodulator 148 and output meter 149 to provide a simultaneous indication of the intensity of the target image, here denoted radiometer output.

The tracking circuit is a null-seeking system which aligns the central axis of the member 47 with the boresight axis to the source 44. The tracking apparatus operates in response to position error signals derived from the azimuth and elevation circuits 59 and 60. Position error signals are produced, for example, in the manner described with respect to FIGS. 1–3.

Figure 6:
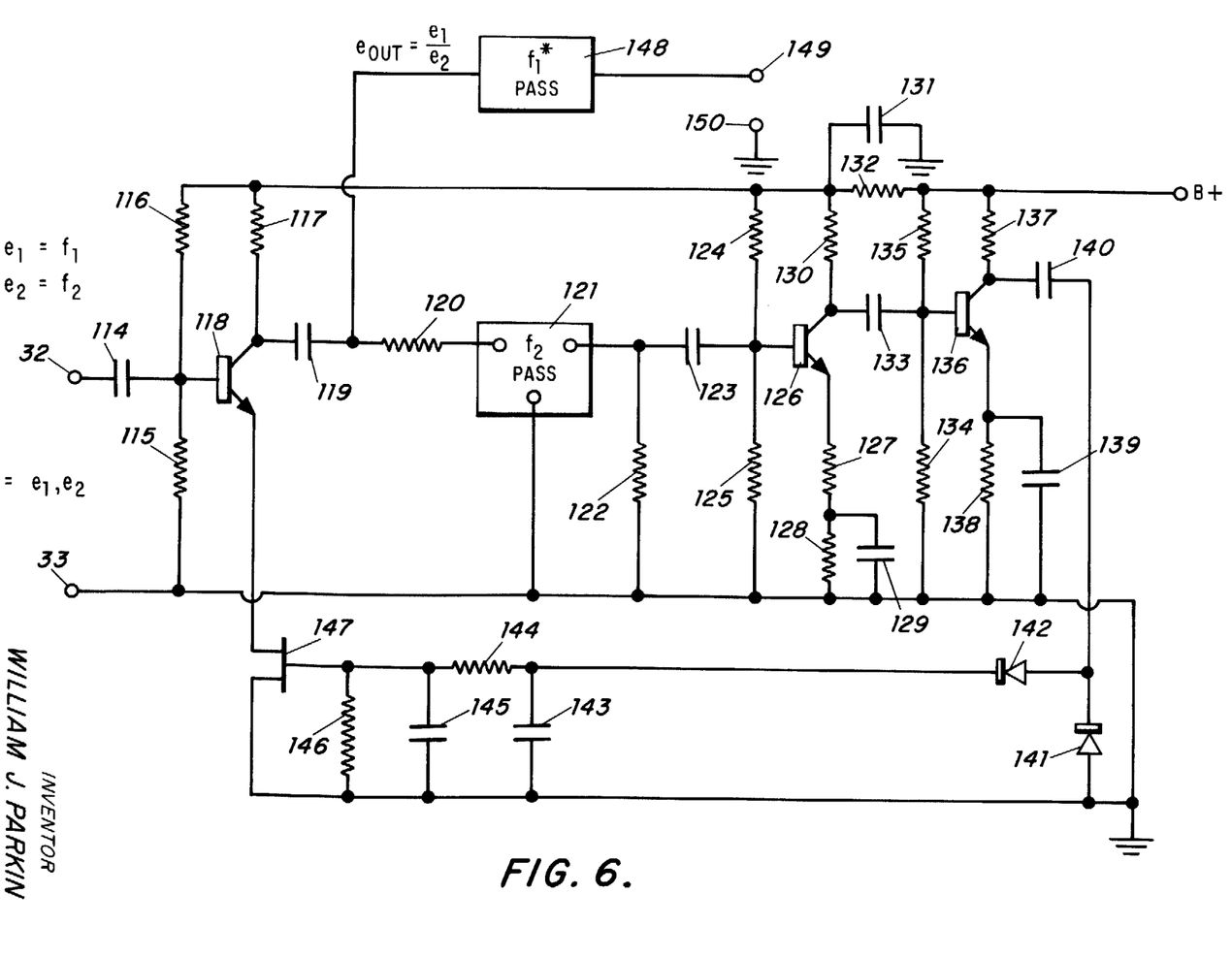
FIG. 6 is a detailed circuit diagram of a divider circuit useful in the invention.

DESCRIPTION AND EXPLANATION OF THE DIVIDER CIRCUIT IN FIG. 6

Referring now to FIG. 6, there is here illustrated a detailed schematic circuit diagram of a divider circuit useful in the present invention. The circuit as here illustrated broadly corresponds to the divider 102, filter 103 and amplifier 113 in FIG. 4. An input signal is applied to the terminals 32 and 33 including a composite $f_1$ signal representing horizontal, vertical and intensity, $\overline{X}$, $\overline{Y}$ and I, information and an $F_2$ signal representing intensity, I, information. The signal is coupled through a capacitor 114 and appears across a resistor 115 connected between the base of a transistor 118 and ground. The base is connected through a resistor 116 to a dropping resistor 132 to a source of positive voltage labeled B+. The emitter of the transistor 118 is connected through a field effect or unipolar transistor 147 to ground. The collector of the transistor 118 is coupled through a resistor 117 to B+. The output of the transistor 118 is connected through a capacitor 119 and resistor 120 to an $f_2$ pass filter 121. Another output of the transistor 118 is coupled through the capacitor 119 to a divider $f_1$ pass filter 148 to output terminals 149 and 150.

The output of the filter 121 is coupled through a two stage resistance coupled amplifier associated with a pair of transistors 126 and 136. The filter 121 is coupled through a resistor 122 to ground and through a capacitor 123 to the base of transistor 126. The base of the transistor 126 is connected through a base resistor 125 to ground and through a dropping resistor 124 to B+. The collector is coupled through a load resistor 130 to B+. A decoupling capacitor 131 is connected between the resistors 130 and 132 and ground. The emitter of the transistor 126 is connected through a degenerative bias resistor 127 and bias resistor 128 to ground. In parallel with the resistor 128 is a by-pass capacitor 129. The collector of the transistor 126 is coupled through a capacitor 133 to a base resistor 134 of the transistor 136. The base is connected through a dropping resistor 135 to B+. The emitter is connected through a bias resistor 138 and parallel bypass capacitor 139 to ground. The collector is connected through a load resistor 137 to B+ and is coupled through a capacitor 140 to a discharge diode 141 to ground. The capacitor 140 is connected in parallel to a rectifying diode 142 and to a resistance-capacitance filter comprising the series resistor 144 and by-pass capacitors 143 and 145 as shown. The junction between the capacitor 145 and the resistor 144 is connected to the gate or grid of the field effect transistor 147. A grid load resistor 146 is connected between the grid of the transistor 147 and ground. The cathode or source of the transistor 147 is grounded and the plate or drain is connected directly to the emitter of the transistor 118.

OPERATION

Since $f_1$ is a function of azimuth, elevation and intensity, i.e., $\overline{X}$, $\overline{Y}$ and I, and $f_2$ is a function of intensity, I, the purpose of the circuit is to provide a voltage ratio of the form: Equation (1):

$$\frac{e_1}{e_2} = e_3$$

where $e_1$ and $e_2$ are distinct and separable signals representative of $f_1$ and $f_2$ respectively, and $e_3$ is representative of $f_1$. Given an amplifier having a transfer function with gain A such that: Equation (2): $Ae_2 = e_0 = $ constant,
then Equation (3):

$$A = \frac{C}{e_2}.$$

By applying an input signal $e_1$ through the amplifier, we obtain:
Equation (4):
$$e_3 = Ae_1.$$
Substituting from Equation (3) above, we obtain:
Equation (5):

$$e_3 = \frac{Ce_1}{e_2}.$$

where $c$ any gain constant and can be made equal to 1.

It is then necessary that the amplifier have sufficient gain to maintain the amplified signal $e_2$ equal to a constant over the operating range. With reference to the circuit in FIG. 6, the composite signal $f_1$ and the intensity signal $f_2$ are impressed on the terminals 32 and 33 and coupled to the transistor 118. The bipoplar transistor 118 has a variable gain characteristic which is determined by the impedance in the emitter circuit as provided by the field effect transistor 147. If $f_2$ were not present, the circuit associated with the transistor 118 amplifies the $f_1$ signal to saturation amplitude and provides in its output the composite $f_1$ signal. Given the presence, however, of an $f_2$ signal, a $\Delta f_2$ signal is coupled through a filter 121 and amplified by two stages of amplification associated with the transistors 126 and 136 to apply an amplified $\Delta f_2$ signal to the rectifying diode 142.

The rectified signal is coupled to the circuit comprising the resistor 144 and capacitors 143 and 145 to apply a DC voltage across the grid resistor 146 of the field effect transistor 147. In closed loop operation, the DC voltage variations are relatively compressed. As the amplitude of the $\Delta f_2$ signal tends to increase the impedance of the transistor 147 increases to decrease the gain of the amplifier associated with the transistor 118. The decrease in gain is in accordance with the incremental increase in amplitude of the $f_2$ signal representative of intensity. As the amplification or gain of the transistor 118 goes down the output signal $f_1$ decreases in amplitude; inversely with the intensity. Thus, effectively the composite signal $f_1$ is divided by the intensity signal $f_2$ to produce an output signal $f_1$ which is independent of the intensity.

In a divider circuit which was actually built and tested, there follows a list of circuit elements which were used in the circuit of FIG. 6. It will be understood that these circuit elements are representative only of a particular embodiment and may be varied greatly without departing from the scope of the invention. Capacitor 114, 22 microfarads; resistor 115, 33 kilohm; resistor 116, 390 kilohms; transistors 118, 126 and 136, 2N929; transistor 147, 2N2Y98; resistor 117, 4.7 kilohms; capacitor 119, 15 microfarads; resistor 120, 5.6 kilohms; filter 121, 1300 cycles bandpass filter as manufactured by United Transformer Corp.; resistor 122, 10 kilohms; capacitor 123, 10 microfarads; resistor 124, 220 kilohms; resistor 125, 68 kilohms; resistor 127, 100 ohms; resistor 128, 3.3 kilohms; capacitor 129, 39 microfarads; resistor 130, 3.3 kilohms; capacitor 131, 20 microfarads; resistor 132, 1 kilohm; capacitor 133, 15 microfarads; resistor 132, 33 kilohms; resistor 135, 120 kilohms; resistor 137, 3.3 kilohms; resistor 138, 1 kilohm; capacitor 139, 39 microfarads; capacitor 140, 6.8 microfarads; diodes 141 and 142, 1N628; capacitor 143, 6.8 microfarads; resistor 144, 10 kilohms; capacitor 145, 1 microfarad; resistor 146, 68 kilohms; B+, 12 volts; filter 148, 400 cycles bandpass filter manufactured by United Transformer Corp.

From the foregoing discussion, it will be apparent that the invention has broad application in the field of radiant energy detection and tracking. The invention is applicable to the problem of a tracking radiometer where the temperature of a moving object can, for example, be continuously monitored while the spot position relative to the boresight axis is continuously indicated.

While there has herinbefore been presented what is at present considered to be the preferred embodiment of the invention, it will be apparent to those of ordinary skill in the art that many modifications and changes may be made thereto without departing from the true spirit and scope of the invention. It will be considered, therefore, that all those changes and modifications which fall fairly within the scope of the invention will be a part of the invention.

What is claimed is:

1. Radiant energy detection apparatus, comprising:

radiation responsive, variable impedance detector means having a detector element adapted to vary in impedance in response to said radiation for producing a composite signal representative of a plurality of parameters of said radiant energy in accordance with the variation of a detector element impedance with respect to another detector element impedance, said element having four input ohmic terminals arranged in a rhombic pattern and a centrally disposed output terminal;

primary biasing means coupled to said detector means for coupling a pair of quadrature phased, alternating current primary bias signals through said element through said input terminals;

load impedance means coupled to said detector means for developing a reference signal representative of a selected one of said plurality of parameters in accordance with the variation of said detector element impedance with respect to said load impedance;

secondary biasing means coupled to said detector means for coupling a secondary bias signal through said load impedance and said element through all of said terminals; and computer means coupled to said detector and load means for producing, in response to said composite and reference signals, an output signal representative of the quotient between said composite and reference signals, whereby variations in said output signal occur independently of variations in said selected one of said plurality of parameters.

2. Radiant energy detection apparatus, comprising:

radiation responsive, variable impedance detector means having a detector element adapted to vary in impedance in response to said radiation for producing a composite signal representative of a plurality of parameters of said radiant energy in accordance with the variation of a detector element impedance with respect to another detector element impedance, said element having four input ohmic terminals arranged in a rhombic pattern and a centrally disposed output terminal;

primary biasing means coupled to said detector means for coupling a pair of quadrature phased, alternating current primary bias signals through said element through said input terminals;

load impedance means coupled to said detector means for developing a reference signal representative of a selected one of said plurality of parameters in accordance with the variation of said detector element impedance with respect to said load impedance;

secondary biasing means coupled to said element and said load means for coupling a secondary bias signal along a direct current path through said load means and said element through each of said terminals; and computer means coupled to said detector and load means for producing, in response to said composite and reference signals, an output signal representative of the quotient between said composite and reference signals, whereby variations in said output signal occur independently of variations in said selected one of said plurality of parameters.

3. Radiant energy detection apparatus, comprising:

radiation responsive, variable impedance detector means having a detector element adapted to vary in impedance in response to said radiation for producing a composite signal representative of a plurality of parameters of said radiant energy in accordance with the variation of a detector element impedance with respect to another detector element impedance;

primary alternating current biasing means coupled to said detector means for coupling a primary bias signal through said element through said input terminals;

load impedance means coupled to said detector means for developing a reference signal representative of a selected one of said plurality of parameters in accordance with the variation of said detector element impedance with respect to said load impedance;

secondary alternating current biasing means coupled to said element and said load means for coupling a secondary bias signal through said load means and said element through all of said terminals; and computer means coupled to said detector and load means for producing, in response to said composite and reference signals, an output signal representative of the quotient between said composite and reference signals, whereby variations in said output signal occur independently of variations in said selected one of said plurality of parameters.

4. Radiant energy detection apparatus, comprising:

radiation responsive, variable impedance means having a detector element with four input ohmic bias terminals arranged in a peripheral equidistant pattern and an output ohmic terminal centrally disposed with respect to said pattern, said element being adapted to vary in impedance in response to said radiation for producing a composite signal representative of a plurality of parameters of said radiant energy in accordance with the variation of a detector element impedance with respect to another detector element impedance;

primary biasing means coupled to said element through said input terminals for coupling a pair of alternating current primary bias signals through said element, said bias signals being in phase quadrature and each said bias signal being coupled through a pair of diagonally opposed input terminals;

load impedance means coupled to said element through said output terminal for developing a reference signal representative of a selected one of said plurality of parameters in accordance with the variation of said detector element impedance with respect to said load impedance;

secondary biasing means coupled to said element through all of said terminals, said primary biasing and said load impedance means for coupling a secondary bias signal there through;

computer means coupled to said detector and load means through said output terminal for producing, in response to said composite and reference signals, an output signal representative of the quotient between said composite and reference signals, whereby variations in said output signal occur independently of variations in said selected one of said plurality of parameters; and balancing means coupled to said biasing means between said element and said biasing means for each said bias signal and including a variable voltage control for producing a variable reference voltage level to balance said bias and output signals with respect to said reference level.

5. The apparatus of claim 1 wherein: said detector element includes quadrant sectors.

6. The apparatus of claim 5 wherein: said detector element is a photoconductor.

* * * * *